United States Patent
Hoshino et al.

(10) Patent No.: US 10,129,869 B2
(45) Date of Patent: *Nov. 13, 2018

(54) RADIO RECEPTION APPARATUS, RADIO TRANSMISSION APPARATUS, AND RADIO COMMUNICATION METHOD

(71) Applicant: Sun Patent Trust, New York, NY (US)

(72) Inventors: Masayuki Hoshino, Kanagawa (JP); Akihiko Nishio, Kanagawa (JP); Seigo Nakao, Kanagawa (JP); Daichi Imamura, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,283

(22) Filed: Nov. 14, 2017

(65) Prior Publication Data

US 2018/0070342 A1 Mar. 8, 2018

Related U.S. Application Data

(63) Continuation of application No. 15/264,940, filed on Sep. 14, 2016, now Pat. No. 9,867,181, which is a
(Continued)

(30) Foreign Application Priority Data

Mar. 16, 2009 (JP) ................. 2009-063120

(51) Int. Cl.
*H04W 72/04* (2009.01)
*H04W 72/12* (2009.01)
(Continued)

(52) U.S. Cl.
CPC ........ *H04W 72/044* (2013.01); *H04B 7/0486* (2013.01); *H04B 7/0626* (2013.01);
(Continued)

(58) Field of Classification Search
None
See application file for complete search history.

(56) References Cited

U.S. PATENT DOCUMENTS 8,442,569 B2   5/2013   Hoshino et al.
2008/0159439 A1*  7/2008   Bitran ............... H04W 52/0248
                                                    375/316
(Continued)

FOREIGN PATENT DOCUMENTS

CN   101005472 A   7/2007
CN   101325573 A   12/2008
(Continued)

OTHER PUBLICATIONS

Motorola; "Downlink RS Design for Supporting Higher order SU/MU-MIMO and CoMP", R1-090796, 3GPP, Feb. 8, 2009, <URL:http://www.3gpp.org/ftp/tsg_ran/WG1_RL1/TSGR1_56/Docs/R1-090796.zip> pp. 1-8.
(Continued)

*Primary Examiner* — Ayaz R Sheikh
*Assistant Examiner* — Mariela Vidal Carpio
(74) *Attorney, Agent, or Firm* — Pearne & Gordon LLP

(57) ABSTRACT

Where first and second reference signals for a first and second communication system, respectively, are transmitted, resources that affect a reception apparatus compatible only with the first communication system can be minimized, and the throughput can be prevented from being deteriorated. As resources for a reference signal CSI-RS for LTE-A, last half symbols in a time direction of a resource unit RB/Sub-frame defined in a frequency-time domain are used, and the CSI-RS is allocated in a position up to the last two symbols or in the last symbol, or the like, of a particular RB/Sub-frame and transmitted when a reference signal 4RS for LTE is transmitted to a reception apparatus in addition to transmitting CSI-RS for LTE-A. The reception apparatus
(Continued)

receives CSI-RS allocated in the last half symbol of RB/Sub-frame based on CSI-RS allocation information, measures channel quality by using this CSI-RS, and transmits and reports feedback information.

11 Claims, 13 Drawing Sheets

Related U.S. Application Data continuation of application No. 14/969,943, filed on Dec. 15, 2015, now Pat. No. 9,491,742, which is a continuation of application No. 14/698,372, filed on Apr. 28, 2015, now Pat. No. 9,265,042, which is a continuation of application No. 14/552,687, filed on Nov. 25, 2014, now Pat. No. 9,049,064, which is a continuation of application No. 13/254,628, filed as application No. PCT/JP2010/000835 on Feb. 10, 2010, now Pat. No. 8,937,875.

(51) Int. Cl.
| | |
|---|---|
| *H04L 1/00* | (2006.01) |
| *H04L 1/06* | (2006.01) |
| *H04L 1/20* | (2006.01) |
| *H04L 5/00* | (2006.01) |
| *H04L 25/02* | (2006.01) |
| *H04B 7/06* | (2006.01) |
| *H04B 7/0456* | (2017.01) |
| *H04L 1/18* | (2006.01) |

(52) U.S. Cl.
CPC ......... *H04B 7/0632* (2013.01); *H04L 1/0026* (2013.01); *H04L 1/06* (2013.01); *H04L 1/20* (2013.01); *H04L 5/0048* (2013.01); *H04L 5/0051* (2013.01); *H04L 5/0082* (2013.01); *H04L 5/0094* (2013.01); *H04L 25/0224* (2013.01); *H04W 72/0406* (2013.01); *H04W 72/1215* (2013.01); *H04L 1/1829* (2013.01); *H04L 5/006* (2013.01); *H04L 5/0023* (2013.01); *H04L 5/0053* (2013.01); *H04L 5/0073* (2013.01)

(56) References Cited

U.S. PATENT DOCUMENTS

| | | |
|---|---|---|
| 2008/0304467 A1 | 12/2008 | Papasakellariou |
| 2009/0046694 A1* | 2/2009 | Matsumoto ........... H04L 5/0007 370/343 |
| 2009/0109892 A1* | 4/2009 | Oyman ................ H04L 1/1887 370/315 |
| 2009/0186613 A1* | 7/2009 | Ahn .................... H04W 72/042 455/434 |
| 2009/0245088 A1 | 10/2009 | Takeuchi |
| 2009/0324073 A1 | 12/2009 | Wengler et al. |
| 2010/0034077 A1* | 2/2010 | Ishii .................... H04J 11/00 370/210 |
| 2010/0046412 A1 | 2/2010 | Varadarajan et al. |
| 2010/0103991 A1* | 4/2010 | Hart .................... H04B 7/155 375/211 |
| 2010/0104034 A1 | 4/2010 | Nam et al. |
| 2010/0135242 A1* | 6/2010 | Nam ..................... H04L 5/0007 370/330 |
| 2010/0149962 A1* | 6/2010 | Cho ..................... H04L 5/06 370/210 |
| 2010/0246604 A1* | 9/2010 | Kim ..................... H04L 1/0057 370/474 |
| 2010/0284490 A1 | 11/2010 | Kim et al. |
| 2011/0006636 A1 | 1/2011 | Shin et al. |
| 2011/0007728 A1 | 1/2011 | Jading et al. |
| 2011/0085536 A1* | 4/2011 | Taoka ................... H04L 5/0007 370/338 |
| 2011/0116572 A1* | 5/2011 | Lee, II ................. H04B 7/0691 375/295 |
| 2011/0188414 A1 | 8/2011 | Dai et al. |
| 2011/0194523 A1 | 8/2011 | Chung |
| 2011/0211569 A1* | 9/2011 | Koivisto ............... H04B 7/0682 370/345 |
| 2011/0228718 A1* | 9/2011 | Noh ....................... H04L 5/0051 370/312 |
| 2011/0235607 A1* | 9/2011 | Haustein ............... H04L 5/0048 370/329 |
| 2011/0237270 A1 | 9/2011 | Noh et al. |
| 2011/0255519 A1* | 10/2011 | Tamaki .................. H04L 1/004 370/335 |
| 2011/0261744 A1 | 10/2011 | Lunttila et al. |
| 2011/0299449 A1* | 12/2011 | Kwon ................... H04L 5/0023 370/312 |
| 2011/0300890 A1 | 12/2011 | Hoshino et al. |
| 2012/0087442 A1 | 4/2012 | Xu |
| 2012/0106501 A1 | 5/2012 | Kishiyama et al. |
| 2012/0106610 A1 | 5/2012 | Nogami |
| 2012/0188937 A1* | 7/2012 | Wang .................... H04L 5/0048 370/315 |
| 2013/0250855 A1 | 9/2013 | Bhattad et al. |

FOREIGN PATENT DOCUMENTS

| | | | |
|---|---|---|---|
| JP | 2010-219817 A | 9/2010 | |
| JP | 2011-504719 A | 2/2011 | |
| WO | 2008/015625 A2 | 2/2008 | |
| WO | 2008/105267 A1 | 9/2008 | |
| WO | WO2008/105267 * | 9/2008 | ............. H04J 11/00 |
| WO | 2009/139383 A1 | 11/2009 | |
| WO | 2010/064842 A2 | 6/2010 | |
| WO | 2010/085909 A1 | 8/2010 | |
| WO | WO2010/085909 * | 8/2010 | ............. H04B 7/04 |
| WO | 2010/106725 A1 | 9/2010 | |

OTHER PUBLICATIONS

Catt et al; "Way forward on downlink reference signals for LTE-A", R1-091066, 3GPP, Feb. 9, 2009, <URL:http://www.3gpp.org/ftp/tsg_ran/WG1_RL1/TSGR1_56/Docs/R1-091066.zip> pp. 1-2.

Samsung; "DL RS Designs for Higher Order MIMO" R1-090619, 3GPP TSG RAN WG1 #56, Feb. 9, 2009, pp. 1-7.

International Search Report for PCT/JP2010/000835 dated Mar. 16, 2010.

Daichi Imamura et al., Status of Standardization in 3GPP RAN WG1 for LTE-Advanced, Mar. 17-20, 2009, Tokyo Japan.

Masayuki Hoshino et al., The reference signal structure and multi-antenna transmission scheme in E-UTRA downlink, Sep. 16-19, 2008.

Masayuki Hoshino et al., A study on feedback related resource control scheme for downlink MIMO in Evolved UTRA, Japan, (2008).

Takeo Ohgane et al., Multi-Antenna Techniques for LTE-Advanced, Mar. 17-20, 2009.

Sharp, et al., 3GPP TSG RAN WG1 Meeting #55bis, Ljubljana, Slovenia, Jan. 12-16, 2009, "Backward compatible design of downlink reference signals in LTE-Advanced", R1-090023.

Chinese Office Action for Application No. 201080011953.8 dated Sep. 4, 2013.

Motorola, 3GPP TSG RAN1 #55, Prague, Czech Republic Nov. 10-14, 2008, R1-084408, "Common Reference Symbol Mapping/Signaling for 8 Transmit Antennas".

Qualcomm Europe, Further Considerations and Link Simulations on Reference Signals in LTE-A, 3GPP TSG-RAN, WG1#56, R1-090875, Feb. 2009.

Nortel, Design Aspect for Higher-order MIMO in LTE-advanced, 3GPP TSG-RAN, Working Group 1 Meeting #55b, R1-090144, Jan. 2009.

Samsung, Impact of DL CQI RS Insertion on Rel-8 PDSCH Performance,3GPP TSG-RAN, WG1#56, R1-090621, Feb. 2009.

(56) References Cited

OTHER PUBLICATIONS

Texas Instruments, Downlink Reference Signal Multiplexing for 8TxTransmission, 3GPP TSG-RAN, WG1#56, R1-090592, Feb. 2009.
Huawei, Common RS for DL high-order MIMO, 3GPP TSG-RAN, WG1#56, R1-090826, Feb. 2009.
Partial Supplementary European Search Report dated Sep. 18, 2015.
"Reference Signal Design in Downlink MIMO," 3GPP TSG RAN WG1 Meeting #45, R1-062020, Aug. 28-Sep. 1, 2006, Tallinn, Estonia.
"Views for DL MIMO Operation in LTE-A," 3GPP TSG-RAN WG1 #56, R1090874, Feb. 9-13, 2009, Athens, Greece.
"SRS Transmission Issues for LTE-A", 3GPP TSG RAN WG1 #55bis, R1-090100, Jan. 14-18, 2009, Ljubljana, Slovenia.

* cited by examiner

RADIO RECEPTION APPARATUS, RADIO TRANSMISSION APPARATUS, AND RADIO COMMUNICATION METHOD

CROSS-REFERENCE TO RELATED APPLICATIONS

This application is a continuation of U.S. patent application Ser. No. 15/264,940 filed on Sep. 14, 2016 which is a continuation of U.S. patent application Ser. No. 14/969,943 filed on Dec. 15, 2015, which is a continuation of U.S. patent application Ser. No. 14/698,372 filed on Apr. 28, 2015 which is a continuation of U.S. patent application Ser. No. 14/552,687 filed on Nov. 25, 2014, which is a continuation of U.S. patent application Ser. No. 13/254,628 filed on Sep. 2, 2011, which is the national stage entry of International Application No. PCT/JP2010/000835 filed on Feb. 10, 2010, which claims priority of Japanese Patent Application No. 2009-063120 filed on Mar. 16, 2009 which are incorporated herein by reference in their entirety.

TECHNICAL FIELD

The present invention relates to a radio reception apparatus, a radio transmission apparatus, and a radio communication method which are applicable to a radio communication system such as a cellular system.

BACKGROUND ART

In a radio communication system such as a cellular system, a reference signal for obtaining various indexes of a propagation channel and a transmission signal is introduced. Such a reference signal (RS) is also used, for example, in LTE (Long Term Evolution) for a next generation communication system studied in 3GPP (3rd Generation Partnership Project) which is an international standards body for mobile communication. In downlink communication from a base station to a user equipment, a reference signal which is transmitted from the transmission apparatus (base station) to the reception apparatus (user equipment) is used as principal uses in (1) estimation of a propagation channel for demodulation, (2) a quality measurement for the frequency scheduling or the adaptive MCS (Modulation and Coding Scheme) control, or the like. In LTE, in a multi-antenna system for applying MIMO (Multiple Input Multiple Output), a reference signal is transmitted in a predetermined radio resource unit.

In LTE-advanced (hereinafter, referred to as LTE-A) which is a communication system that advances LTE, in order to achieve further sophistication, introduction of high-order MIMO (for example, transmission 8 antenna) or cooperative multipoint transmission/reception (CoMP) is studied. In addition to the reference signal (first reference signal) which is studied in LTE, therefore, an additional reference signal (second reference signal) is necessary for LTE-A, and a method of transmission is discussed.

As shown in Non-Patent Literature 1, for example, two kinds of reference signals respectively for the above-described uses are studied in LTE-A.

(1) Demodulation RS: one for PDSCH (Physical downlink shared channel) demodulation, to which the same layer number as that of PDSCH and Precoding are applied, and specific to User Equipment (UE) (UE-specific).

(2) CSI-RS: one for CSI (Channel State Information) measurement, (as CSI, there are CQI (Channel Quality Indicator), PMI (Precoding Matrix Indicator), RI (Rank Indicator), and the like), to which Precoding is not applied, and specific to a cell (cell-specific).

However, the use is not mutually exclusive. Specifically, the argument is advanced on the assumption that CSI-RS may be used in the use of (1).

FIG. 12 shows a configuration example of a frame of LTE. In LTE, the minimum unit of the frequency scheduling and the adaptive MCS control is defined as Resource Block (RB, hereinafter referred to as RB) in the frequency direction, and Sub-frame in the time direction. In the signal configuration of one sub-frame and RB (hereinafter, this is referred to as 1 RB/Sub-frame) functioning as a resource unit, as shown in a frame in which RB 15 of Sub-frame #0 in the figure is enlarged, a control signal and the reference signal RS are allocated from the head of the time axis, and then data are allocated. Here, 1 RB/Sub-frame consists of 12 sub-carriers in the frequency direction, and 14 OFDM symbols in the time direction. The reference signal RS is allocated in a specific OFDM symbol and sub-carrier in 1 RB/Sub-frame. The unit of these OFDM symbol and sub-carrier is called RE (Resource Element). There are 168 REs in total in 1 RB/Sub-frame in the case of the number of OFDM symbols and the number of sub-carriers.

FIG. 13 is a diagram showing a conventional example of the above-described CSI-RS transmission method corresponding to LTE-A. The example of FIG. 13 shows, as an example of the CSI-RS transmission method for LTE-A, a method of transmitting CSI-RS for 8 antennas by using only specific RB/Sub-frames (for example, see Non-Patent Literature 2). As shown in FIG. 13, the method is configured so that CSI-RS (second reference signal) for 8 antennas is transmitted by using only the RB/Sub-frames indicated by the oblique lines, and, in the other RB/Sub-frames, only 4RS (first reference signal) corresponding to 4 antennas for LTE is transmitted. In the signal configuration of 1 RB/Sub-frame, as shown in a frame in which RB12 of Sub-frame #0 in the figure is enlarged, a control signal and the reference signal RS for LTE are allocated from the head of the time axis, and then CSI-RS for 8 antennas and data are allocated together with the reference signal RS for LTE. In this case, CSI-RS has a form in which RE for data is reallocated.

The CSI-RS transmission method is configured so that 4RS for LTE is transmitted also in the former resource (RB/Sub-frames of the oblique lines) in which CSI-RS is transmitted, thereby enabling also an LTE user equipment to measure CQI and receive data. Furthermore, RB/Sub-frames for transmitting CSI-RS for 8 antennas are discretely allocated. However, it is possible to accurately measure CQI in each resource by interpolating/averaging the resources.

CITATION LIST

Non-Patent Literature

Non-Patent Literature 1: 3GPP TSG RAN WG1 #56, R1-091066, CATT, CMCC, Ericsson, Huawei, LGE, Motorola, Nokia, Nokia Siemens Networks, Nortel, Panasonic, Philips, Qualcomm Europe, Samsung, Texas Instruments, "Way forward on downlink reference signals for LTE-A", Feb. 9-13, 2009

Non-Patent Literature 2: 3GPP TSG RAN WG1 #56, R1-090619, Samsung, "DL RS Designs for Higher Order MIMO", Feb. 9-13, 2009

SUMMARY OF INVENTION

Technical Problem

In the above-described conventional CSI-RS transmission method, as shown in the frames of FIG. 13, in RB/Subframes for transmitting CSI-RS, the data part is punctured, and therefore the demodulation performance of an LTE user equipment is deteriorated, thereby causing a problem in that the throughput is lowered.

The invention has been conducted in view of the above-described circumstances. It is an object of the invention to provide a radio reception apparatus, a radio transmission apparatus, and a radio communication method in which, in the case where a second reference signal for a second communication system is transmitted in addition to a first reference signal for a first communication system, resources that affect a reception apparatus compatible only with the first communication system can be minimized, and the throughput can be prevented from being deteriorated.

Solution to Problem

The present invention provides, as a first aspect, a radio reception apparatus to be used in a radio communication system where communication is performed by using a plurality of resources defined in a frequency-time domain, the radio reception apparatus including: a resource information acquiring section which is configured to acquire resource allocation information for a second reference signal when the second reference signal for a second communication system is transmitted from a radio transmission apparatus in addition to transmitting a first reference signal for a first communication system, in a case where last half symbols in a time direction of a resource unit defined in the frequency-time domain are used as resources for the second reference signal; a receiver which is configured to receive a signal containing the second reference signal transmitted from the transmission apparatus; a channel quality measuring section which is configured to measure a channel quality of a transmission channel by using the second reference signal that is allocated in the last half symbols of a specific resource unit in the time direction, on the basis of the resource allocation information; and a feedback information transmitter which is configured to transmit feedback information containing channel quality information indicative of the channel quality, to the transmission apparatus.

The present invention includes, as a second aspect, the radio reception apparatus, wherein the channel quality measuring section measures the channel quality by means of the second reference signal which is transmitted to be allocated in a position up to the last two symbols of the specific resource unit in the time direction.

The present invention includes, as a third aspect, the radio reception apparatus, wherein the channel quality measuring section measures the channel quality by means of the second reference signal which is transmitted to be allocated in the last symbol of the specific resource unit in the time direction.

The present invention includes, as a fourth aspect, the radio reception apparatus, wherein the channel quality measuring section measures the channel quality by means of the second reference signal which is transmitted to be allocated in a position of a last half symbol of the specific resource unit in the time direction, the position corresponding to allocation of specific control information in a frequency direction.

The present invention includes, as a fifth aspect, the radio reception apparatus, wherein the first communication system is LTE (Long Term Evolution), the second communication system is LTE-A (LTE-advanced), and the channel quality measuring section measures the channel quality by means of the second reference signal which is transmitted to be allocated in a position of the last symbol of the specific resource unit in the time direction, the position corresponding to a frequency allocation of a control format indicator channel (PCFICH).

The present invention provides, as a sixth aspect, a radio transmission apparatus to be used in a radio communication system where communication is performed by using a plurality of resources defined in a frequency-time domain, the radio transmission apparatus including: a resource setting section which is configured to perform resource setting used in a case where last half symbols in a time direction of a resource unit defined in the frequency-time domain are used as resources for a second reference signal when the second reference signal for a second communication system is transmitted to a radio reception apparatus in addition to transmitting a first reference signal for a first communication system; a reference signal generator which is configured to generate and allocate the second reference signal in the last half symbols of a specific resource unit in the time direction, on the basis of the resource setting for the second reference signal; a transmitter which is configured to transmit a signal containing the second reference signal to the reception apparatus; a feedback information acquiring section which is configured to receive feedback information informed from the reception apparatus, and acquire channel quality information contained in the feedback information; and a scheduler which is configured to perform scheduling containing at least one of frequency scheduling and an adaptive MCS (Modulation and Coding Scheme) control related to a transmission signal, on the basis of the channel quality information.

The present invention includes, as a seventh aspect, the radio transmission apparatus, wherein the resource setting section performs the resource setting in which the second reference signal is allocated in a position up to the last two symbols of the specific resource unit in the time direction.

The present invention includes, as an eighth aspect, the radio transmission apparatus, wherein the resource setting section performs the resource setting in which the second reference signal is allocated in the last symbol of the specific resource unit in the time direction.

The present invention includes, as a ninth aspect, the radio transmission apparatus, wherein the resource setting section performs the resource setting in which the second reference signal is allocated in a position of a last half symbol of the specific resource unit in the time direction, the position corresponding to allocation of specific control information in a frequency direction.

The present invention includes, as a tenth aspect, the radio transmission apparatus, wherein the first communication system is LTE, the second communication system is LTE-A, and the resource setting section performs the resource setting in which the second reference signal is allocated in a position of the last symbol of the specific resource unit in the time direction, the position corresponding to a frequency allocation of a control format indicator channel.

The present invention provides, as an eleventh aspect a radio communication method in a radio reception apparatus which performs communication by using a plurality of resources defined in a frequency-time domain, the radio communication method including the steps of: acquiring resource allocation information for a second reference signal when the second reference signal for a second communication system is transmitted from a radio transmission apparatus in addition to transmitting a first reference signal for a first communication system, in a case where last half symbols in a time direction of a resource unit defined in the frequency-time domain are used as resources for the second reference signal; receiving a signal containing the second reference signal transmitted from the transmission apparatus; measuring a channel quality of a transmission channel by using the second reference signal that is allocated in the last half symbols of a specific resource unit in the time direction, on the basis of the resource allocation information; and transmitting feedback information containing channel quality information indicative of the channel quality, to the transmission apparatus.

The present invention provides, as a twelfth aspect, a radio communication method in a radio transmission apparatus which performs communication by using a plurality of resources defined in a frequency-time domain, the radio communication method including the steps of: performing resource setting used in a case where last half symbols in a time direction of a resource unit defined in the frequency-time domain are used as resources for a second reference signal when the second reference signal for a second communication system is transmitted to a radio reception apparatus in addition to transmitting a first reference signal for a first communication system; generating and allocating the second reference signal in the last half symbols of a specific resource unit in the time direction, on the basis of the resource setting for the second reference signal; transmitting a signal containing the second reference signal to the reception apparatus;
receiving feedback information informed from the reception apparatus, and acquiring channel quality information contained in the feedback information; and performing scheduling containing at least one of frequency scheduling and an adaptive MCS (Modulation and Coding Scheme) control related to a transmission signal, on the basis of the channel quality information.

According to the configuration, when the second reference signal for the second communication system is transmitted in addition to the first reference signal for the first communication system, the second reference signal is transmitted by using last half symbols in the time direction of the resource unit defined in the frequency-time domain, whereby resources that affect a reception apparatus compatible only with the first communication system can be minimized. In this case, a systematic bit and a parity bit in data are allocated from the beginning of the resource, and the second reference signal is not located in the part of the systematic bit of the data. Even in the case where the reception apparatus compatible only with the first communication system is allocated to perform multiplexing, therefore, the possibility that the systematic bit of the data for the user equipment is punctured by the second reference signal can be reduced. Therefore, the possibility that deterioration of the demodulation performance occurs can be reduced. Because of this, the throughput can be prevented from being deteriorated.

In allocation of the second reference signal, preferably, the signal is allocated in a position up to the last two symbols from the end of a specific resource unit in the time direction, in a position of the last symbol, or the like. In the frequency direction, the second reference signal is allocated in a position corresponding to allocation of specific control information. Therefore, the frequency resource notification of the control information can be diverted, and the second reference signal can be widely distributed in the system band. In the case where the first communication system and the second communication system are caused to correspond to LTE and LTE-A, respectively, it is preferable to allocate the second reference signal so as to correspond to the frequency allocation of the control format indicator channel (PCFICH). In this case, even when LTE user equipments are multiplexed, the second reference signal is allocated in a symbol in a position where a parity bit is likely to be allocated. The possibility that the systematic bit of the data for an LTE user equipment is punctured can be reduced. Therefore, deterioration of the demodulation performance in an LTE user equipment can be avoided. Because of this, the throughput can be prevented from being deteriorated.

Advantageous Effects of Invention

According to the invention, it is possible to provide a radio reception apparatus, a radio transmission apparatus, and a radio communication method in which, in the case where a second reference signal for a second communication system is transmitted in addition to a first reference signal for a first communication system, resources that affect a reception apparatus compatible only with the first communication system can be minimized, and the throughput can be prevented from being deteriorated.

DESCRIPTION OF EMBODIMENTS

Figure 1:
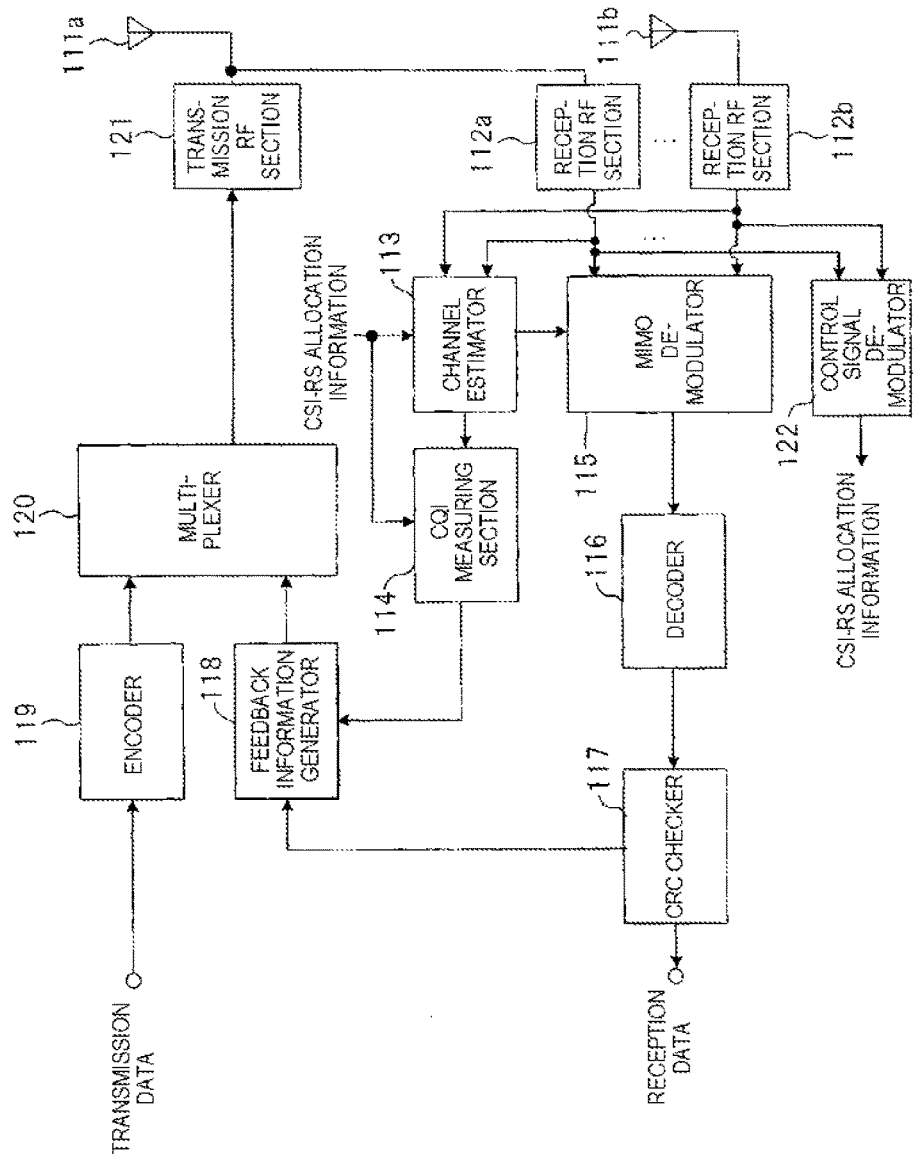
FIG. 1 is a block diagram showing the configuration of main portions of a reception apparatus which is used in embodiments of the invention.

In embodiments of the invention, an example will be described in which a radio reception apparatus, a radio transmission apparatus, and a radio communication method are applied to a cellular system for mobile communication such as a mobile telephone. Here, a case where, in a radio communication system in which a base station (BS) is a transmission apparatus, and a user equipment (UE) of a mobile station is a reception apparatus, communication based on MIMO is performed will be exemplified. It is assumed that the base station communicates with a user equipment compatible with LTE which is a first communication system, and with a user equipment compatible with LTE-A which is a second communication system. Here, the relationship between the first communication system (LTE) and the second communication system (LTE-A) is assumed that the second communication system is a communication system which, as compared with the first communication system, accepts a larger number of transmission antennas in the reception side. In this case, reference signals for performing the frequency scheduling and the adaptive MCS control are transmitted from the base station to the user equipment. It is assumed that, as the reference signals, a second reference signal CSI-RS for LTE-A (for 8 antennas) is used in addition to a first reference signal 4RS for LTE (for 4 antennas).

First Embodiment

As described in Background Art section, in LTE, an RB/Sub-frame which is a resource unit defined by RB in the frequency direction and Sub-frame in the time direction is used as a plurality of resources which are defined in a frequency-time domain of the frequency and the time. In the frame configuration of LTE, the frequency scheduling and the adaptive MCS control are performed while taking an RB/Sub-frame as the minimum unit. In the embodiment, in one physical RB/Sub-frame, a reference signal CSI-RS for LTE-A is transmitted while being allocated to a last half symbol of a plurality of symbols in the time direction. In the embodiment, namely, attention is focused on the method of allocating reference signals which are additionally transmitted, and a reference signal CSI-RS for LTE-A is transmitted to be allocated to a last half part in a resource which is in a position where a parity bit is likely allocated in allocation of data.

According to the configuration, in a specific RB/Sub-frame for transmitting CSI-RS, CSI-RS is allocated in last half part of a plurality of symbols, particularly, several end symbols, specifically, positions up to the last two symbols or the last symbols from the ends, or the like. Thus, CSI-RS exists only in the vicinities of the ends of resources of one physical RB/Sub-frame. A specific example of the CSI-RS transmission method in the embodiment will be described later in detail.

In the configuration which uses the above-described CSI-RS transmission method, resources that affect an LTE user equipment compatible only with LTE can be minimized, whereby the throughput can be prevented from being deteriorated. More specifically, in the case where LTE user equipments are multiplexed in resources in which CSI-RS is transmitted, the possibility that the systematic bit of the data part for an LTE user equipment is likely punctured by CSI-RS can be reduced, and hence deterioration of the demodulation performance can be suppressed. According to the embodiment, therefore, deterioration of the demodulation performance due to the reference signal CSI-RS for added LTE-A can be avoided, and hence the throughput can be prevented from being lowered. According to the configuration, high-order MIMO and cooperative multipoint transmission/reception of a multi-antenna system in a cellular system can be realized with excellent characteristics.

Next, the configuration of a specific example of reception and transmission apparatuses of the radio communication system of the embodiment will be described.

Figure 2:
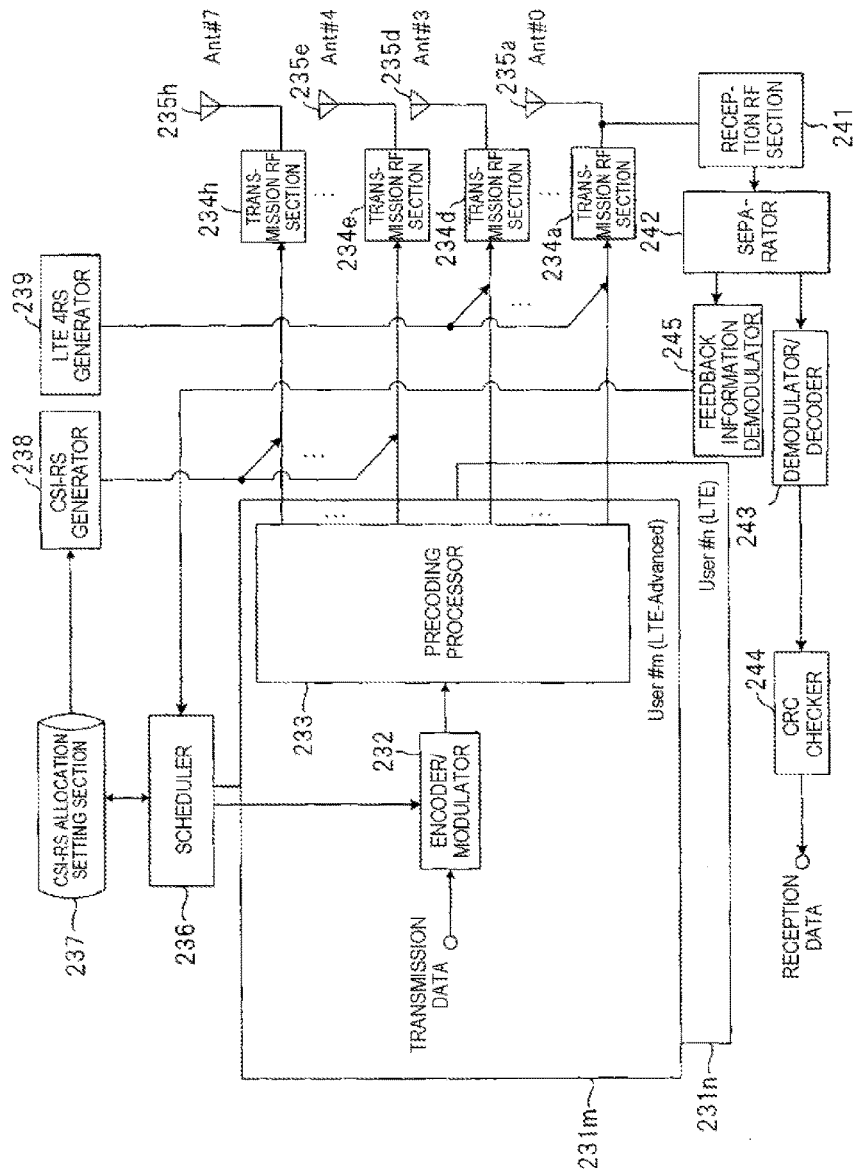
FIG. 2 is a block diagram showing the configuration of main portions of a transmission apparatus which is used in the embodiments of the invention.

FIG. 1 is a block diagram showing the configuration of main portions of the reception apparatus which is used in the embodiment of the invention, and FIG. 2 is a block diagram showing the configuration of main portions of a transmission apparatus which is used in the embodiment of the invention.

In the embodiment, a case where radio communication is performed by using a radio wave between the reception apparatus shown in FIG. 1 and the transmission apparatus shown in FIG. 2 is assumed. Here, it is supposed that the transmission apparatus shown in FIG. 2 is applied to a radio communication base station apparatus (base station, BS) in a cellular system, and the reception apparatus shown in FIG. 1 is applied to a user equipment (UE) which is a radio communication mobile station such as a portable telephone. Here, it is presumed that a MIMO system in which radio transmission/reception is performed by using a plurality of antennas in both transmission and reception is configured, the transmission apparatus can perform transmission to each of a plurality of reception apparatuses, and Precoding transmission in which the plurality of antennas are weighted in the transmission side is performed. In the mode of a communication signal, for example, it is assumed that communication is performed according to a multicarrier communication system using an OFDM (Orthogonal Frequency Division Multiplexing) signal. As a specific example, the case where the base station functioning as the transmission apparatus performs communication with an LTE user equipment compatible with LTE and LTE-A user equipment compatible with LTE-A which function as the reception apparatuses will be exemplified.

The reception apparatus shown in FIG. 1 includes a plurality of antennas $111a$, $111b$, a plurality of reception RF sections $112a$, $112b$, a channel estimator 113, a CQI measuring section 114, a MIMO demodulator 115, a decoder 116, a CRC checker 117, a feedback information generator 118, an encoder 119, a multiplexer 120, a transmission RF section 121, and a control signal demodulator 122.

A radio wave transmitted from a counter apparatus (for example, the transmission apparatus shown in FIG. 2) is received by the plurality of independent antennas $111a$, $111b$. The high-frequency signal of the radio wave received at the antenna $111a$ is converted in the reception RF section $112a$ into a signal of a relatively low frequency band such as a baseband signal, and then subjected to processes of Fourier transform, parallel/serial conversion, and the like to be converted into a reception signal of serial data. Similarly, the high-frequency signal of the radio wave received at the antenna $111b$ is converted in the reception RF section $112b$ into a signal of a relatively low frequency band such as a baseband signal, and then subjected to processes of Fourier transform, parallel/serial conversion, and the like to be converted into a reception signal of serial data. The outputs of the reception RF sections $112a$, $112b$ are input to the channel estimator 113, the MIMO demodulator 115, and the control signal demodulator 122.

The channel estimator 113 estimate channel based on reference signals contained in the signals transmitted from the transmission antennas of the counter apparatus (transmission apparatus), and calculates a channel estimation value. In this case, based on control information which is separately informed from the transmission apparatus, the reception apparatus identifies the positions of the reference signals for measuring the channel quality. Specifically, the channel estimator 113 receives CSI-RS allocation information as resource information for the second reference signal, and acquires the transmission sub-frame to which CSI-RS that is the reference signal for measuring the channel quality is allocated, and the ID of RB. Then, a channel estimating process is performed while assuming that reference signals are allocated in specific sub-carriers of the OFDM symbol which is on the last half side in the time axis of the corresponding resource. The CSI-RS allocation information is informed with control information from the base station (counter transmission apparatus) or the like. The control signal demodulator 122 demodulates a control signal transmitted from the base station or the like, and extracts and acquires control information such as transmission parameters containing CSI-RS allocation information related to setting of a resource in which CSI-RS is allocated, and information of MCS such as the modulation method and encoding ratio of the transmission signal. In this case, the control signal demodulator 122 previously receives and demodulates the CSI-RS allocation information, and holds it. The channel estimation value calculated by the channel estimator 113 is input to the CQI measuring section 114 and the MIMO demodulator 115.

The CQI measuring section 114 calculates CQI as the channel quality (reception quality) by using the channel estimation value which is output by the channel estimator 113, and outputs it to the feedback information generator 118. In this case, similarly with the channel estimator 113, the CQI measuring section 114 receives the CSI-RS allocation information, and acquires the transmission sub-frame to which CSI-RS that is the reference signal for measuring the channel quality is allocated, and the ID of RB. The frequency/time intervals at which the resources are allocated are identified, processes of averaging and interpolation are performed on the obtained channel estimation value, and then channel quality information is calculated. Specific examples of the channel quality information are CQI corresponding to a predetermined combination of the modulation method and the encoding ratio, PMI which selects a precoding matrix fitting to the current channel situation from a predetermined codebook, and RI corresponding to the desired number of transmission streams.

The MIMO demodulator 115 performs a process of demodulating the reception signal corresponding to the own apparatus (own reception apparatus) by using the channel estimation value received from the channel estimator 113, and outputs the demodulated signal to the decoder 116. In this case, a deinterleave process, a Rate-Dematching process, a likelihood combining process, and the like are performed. The decoder 116 performs a decoding process on the signal input from the MIMO demodulator 115 to restore the received data. In this case, an error correction decoding process is applied to the signal which is received from the MIMO demodulator 115, and which has been undergone the MIMO separation, and then the signal is output to the CRC checker 117. The CRC checker 117 performs an error detecting process by CRC (Cyclic Redundancy Check) check on the decoded signal which is output from the decoder 116, and outputs data error existence information indicating whether the decoded reception data contain an error or not, to the feedback information generator 118. Then, the reception data are output from the CRC checker 117.

The feedback information generator 118 generates feedback information containing the channel quality information (CQI, PMI, RI, or the like) calculated by the CQI measuring section 114. Furthermore, the feedback information generator 118 determines whether the decoded reception data contain an error or not, based on the result of the error detection in the CRC checker 117, and generates Ack/Nack information. If the decoding result does not contain an error, the feedback information generator 118 generates Ack (Acknowledgement), and generates Nack (Negative Acknowledgement) if the decoding result contains an error.

The encoder 119 performs a process of encoding the transmission data, and then outputs the data to the multiplexer 120. The multiplexer 120 performs a multiplexing process on the input feedback information, the transmission signal containing the encoded transmission data, etc. Then, the multiplexer 120 performs a Rate-Matching process of adaptively setting the number of modulation multiple values and the coding ratio, an interleave process, a modulating process, and the like, and outputs a result to the transmission RF section 121. The transmission RF section 121 performs processes of serial/parallel conversion, inverse Fourier transform, and the like, then conversion into a high-frequency signal of a predetermined radio frequency band, power amplification, and then transmission as a radio wave from the antenna 111*a*. At this time, the feedback information such as the channel quality information and the Ack/Nack information transmitted from the reception apparatus is transmitted to the transmission apparatus as a feedback signal to be informed.

In the above-described configuration, the control signal demodulator 122 implements the function of a resource information acquiring section. Moreover, the reception RF sections 112*a*, 112*b* and the MIMO demodulator 115 implement the function of a receiver. Furthermore, the channel estimator 113 and the CQI measuring section 114 implement the function of a channel quality measuring section. Furthermore, the feedback information generator 118, the multiplexer 120, and the transmission RF section 121 implement the function of a feedback information transmitter.

On the other hand, the transmission apparatus shown in FIG. 2 includes a plurality of user equipment signal processors 231*m*, 231*n*, a encoder/modulator 232, a precoding processor 233, a plurality of transmission RF sections 234*a* to 234*d*, and 234*e* to 234*h*, a plurality of antennas 235*a* to 235*d*, and 235*e* to 235*h*, a scheduler 236, a CSI-RS allocation setting section 237, a CSI-RS generator 238, an LTE 4RS generator 239, a reception RF section 241, a separator 242, a demodulator/decoder 243, a CRC checker 244, and a feedback information demodulator 245.

A radio wave transmitted from a counter apparatus (for example, the reception apparatus shown in FIG. 1) is received by the antenna 235*a*. The high-frequency signal of the radio wave received at the antenna 235*a* is converted into a signal of a relatively low frequency band such as a baseband signal in the reception RF section 241, and then input to the separator 242. The separator 242 separates the feedback signal from the reception signal, and outputs the feedback signal to the feedback information demodulator 245, and the other reception signal to the demodulator/decoder 243. The channel quality information, Ack/Nack information, and the like contained in the feedback signal are demodulated in the feedback information demodulator 245, and input to the scheduler 236. Based on the channel quality information informed from the reception apparatus, the scheduler 236 executes at least one of the frequency scheduling and the adaptive MCS control, as scheduling related to the transmission signal.

The demodulator/decoder 243 performs a demodulating process and a decoding process on the reception signal separated in the separator 242 to restore the received data. The CRC checker 244 executes an error detecting process based on CRC checking on the decoded signal output from the demodulator/decoder 243, and determines whether the decoded reception data contain an error or not. Then, the reception data are output from the CRC checker 244.

The user equipment signal processors 231*m*, 231*n* perform a signal process on transmission signals for LTE-A, LTE, and the like, that is, corresponding to respective user equipments, and each of the processors has the encoder/ modulator 232 and the precoding processor 233. The encoder/modulator 232 performs an encoding process on the transmission data, a multiplexing process on the control signal and the like, a Rate-Matching process, an interleave process, a modulating process, and the like, and outputs a result to the precoding processor 233. The precoding processor 233 performs a weighting process for forming a beam of a transmission wave on respective transmission signals which are to be output to the plurality of antennas, and outputs the transmission signals to the transmission RF sections 234a to 234d, and 234e to 234h of the antennas.

In the transmission RF sections 234a to 234d, and 234e to 234h, the transmission signals are subjected to processes of serial/parallel conversion, inverse Fourier transform, and the like, then converted into high-frequency signals of a predetermined radio frequency band, power amplified, and thereafter transmitted as radio waves from the antennas 235a to 235d, and 235e to 235h. A transmitter for LTE-A in the illustrated example generates transmission signals which are to be transmitted by using the 8 antennas. The transmission signals from the transmission apparatus are transmitted to the reception apparatus as, for example, a pilot channel, a control signal, a data signal containing various data, etc. Here, the pilot channel and the control signal are transmitted as non-directional signals which do not form a beam, and the data signal is transmitted as a directional signal in which a predetermined beam corresponding to a beam number is formed by precoding in a predetermined transmission channel.

The CSI-RS allocation setting section 237 separately informs the user equipments of CSI-RS allocation information, and notifies CSI-RS allocation information to the CSI-RS generator 238 and the scheduler 236. The CSI-RS generator 238 generates a reference signal CSI-RS for LTE-A (for 8 antennas), and allocates the CSI-RS in the resource corresponding to transmission sub-frame and the ID of RB. The LTE 4RS generator 239 generates a reference signal 4RS for LTE (for 4 antennas), and allocates it in resources. In the configuration example of FIG. 2, it is supposed that transmission is performed while, with the intention of application to high-order MIMO, CSI-RS is allocated in Ant #4 to Ant #7 (the antennas 235e to 235h), and, in Ant #0 to Ant #3 (the antennas 235a to 235d), only the reference signal 4RS for LTE is allocated. Here, the description has been made with reference to the figure in which application to high-order MIMO is intended. However, transmission of CSI-RS is not limited to this. In the case where antenna reference signals which are larger in number than those for LTE are received in the reception side, for example, an operation of receiving reference signals transmitted from a plurality of base stations may be possible. Here, the example in which LTE is set to 4 antennas and high-order MIMO is set to additional 4 antennas has been described. The configuration is not limited to this. For example, LTE may be set to 2 antennas and high-order MIMO may be set to additional two antennas, a combination of the both may be employed, or a total of 8 antennas in which LTE is set to 2 antennas and high-order MIMO is set to additional 6 antennas may be employed. Here, the example in which CSI-RS is not allocated in the antennas where the reference signal for LTE is allocated has been described. The configuration is not limited to this. For example, CSI-RS may be allocated in all of the antennas Ant #0 to Ant #7.

The scheduler 236 performs allocation of the user equipments by using the received CSI-RS allocation information. In this case, based on the transmission sub-frame and the ID of RB corresponding to CSI-RS, allocation of LTE user equipments is performed by using DVRB (Distributed Virtual RB) which is a distribution resource defined by LTE, LVRB (Localized Virtual RB) which is a continuous allocation resource, or the like. Here, DVRB is a distributed type resource configured so that one physical RB/Sub-frame is divided into first and last half slots in the time direction, and resources of a unit of one logical RB/Sub-frame are hopped in the first and last half slots in the frequency direction to be discretely allocated in two different physical RB/Sub-frames at predetermined frequency intervals, thereby causing resources to be distributedly allocated. LVRB is a continuous allocation type resource where resources are concentrically allocated by, for example, continuously allocating resources.

In the above-described configuration, the CSI-RS allocation setting section 237 implements the function of a resource setting section. The CSI-RS generator 238 implements the function of a reference signal generator. The user equipment signal processors 231m, 231n and the transmission RF sections 234a to 234d, and 234e to 234h implement the function of a transmitter. The reception RF section 241, the separator 242, and the feedback information demodulator 245 implement the function of a feedback information acquiring section.

Figure 3:
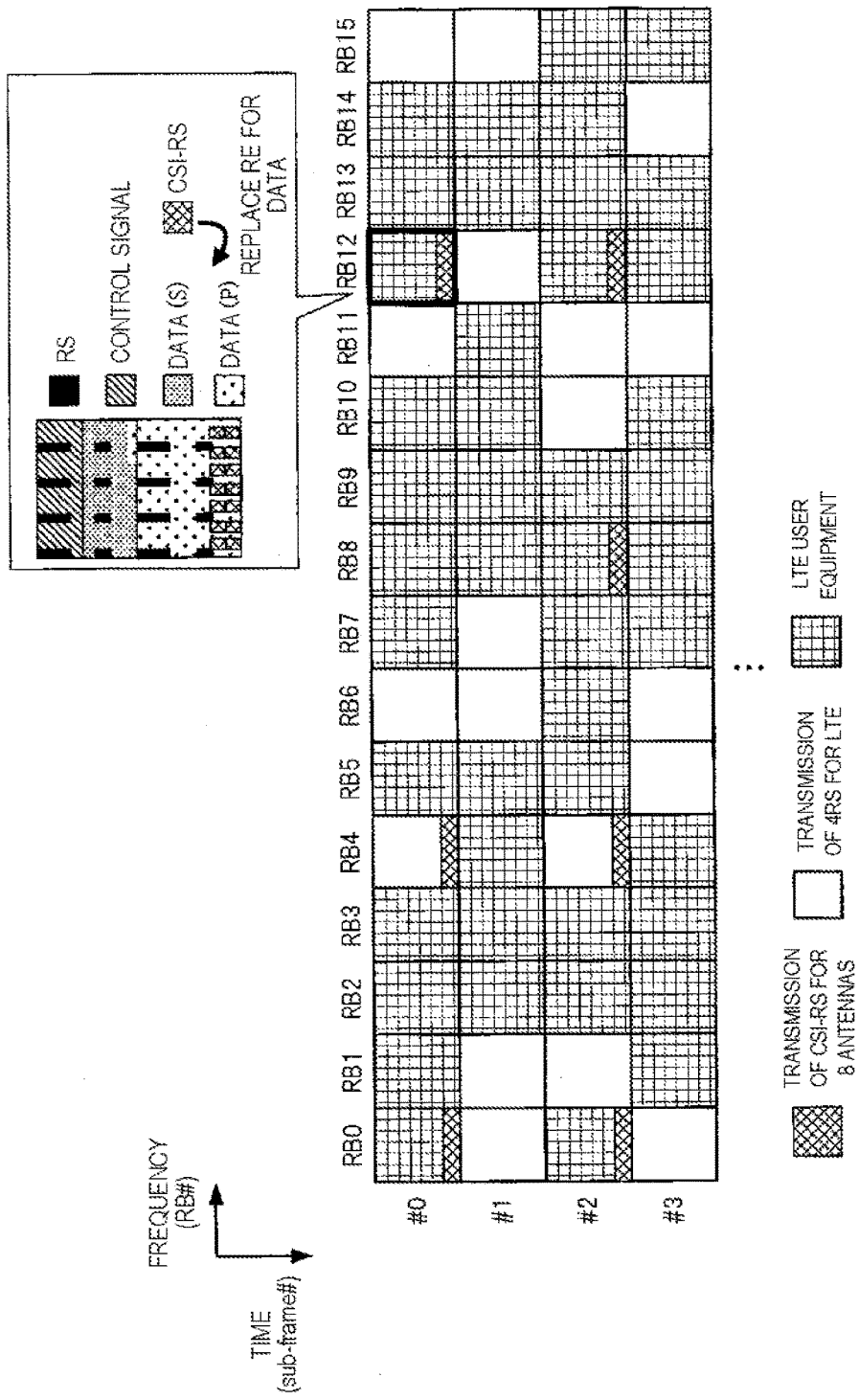
FIG. 3 is a diagram showing the CSI-RS transmission method in a first embodiment.

Next, the method of transmitting CSI-RS which is the reference signal for measuring the channel quality will be described in detail. FIG. 3 is a diagram showing the CSI-RS transmission method in the first embodiment, and shows an allocation example of reference signals, control signals, data, and the like on resources. In the first embodiment, it is assumed that, among RBs of Sub-frame #0, reference signal allocation resources are set every 4 RBs (RB0, RB4, RB8, RB12) with starting from RB0, and a symbol which is in the last side (last half side) of the corresponding resource in the time direction, for example, the last 1 or 2 symbols of the end (blocks indicated by net-like hatching in the figure) is used in transmission of the reference signal CSI-RS. An example in which an LTE user equipment is allocated to RB0, RB1, RB2, RB3, RB5, RB7, RB8, RB9, RB10, RB12, RB13, RB14 (blocks indicated by lattice hatching in the figure) is shown.

The CSI-RS allocation setting section 237 sets resources of reference signals so that CSI-RS is allocated in a symbol which is in the last half side in the time direction, for example, the last one or two symbols of the end of one RB/Sub-frame, in resources at predetermined frequency intervals, as described above. In accordance with the above-described allocation setting of CSI-RS, the CSI-RS generator 238 generates CSI-RS, and allocates it in a symbol of the corresponding resource. Based on the above-described allocation setting of CSI-RS, the scheduler 236 allocates an LTE user equipment to a resource containing a RB/Sub-frame for transmitting CSI-RS.

Figure 4:
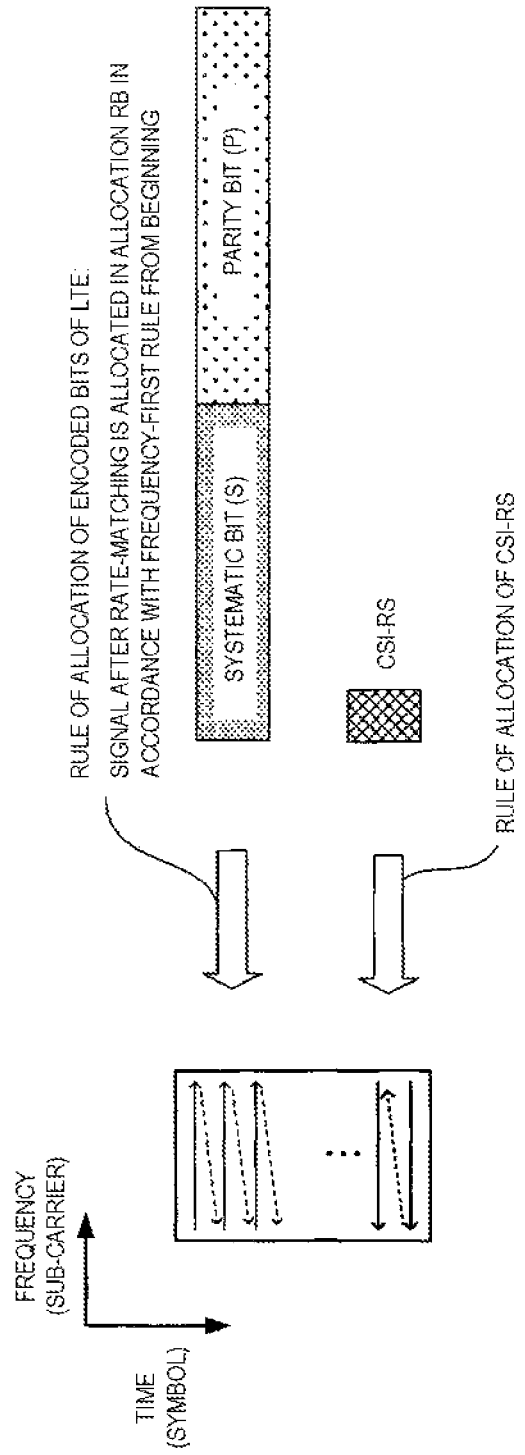
FIG. 4 is a diagram illustrating the rule of allocation of encoded bits of LTE and the rule of allocation of CSI-RS according to the embodiment.

Here, the allocation relationship of the allocation of CSI-RS in one RB/Sub-frame and a systematic bit and parity bit of the data part will be described. FIG. 4 is a diagram illustrating the rule of allocation of encoded bits of LTE and the rule of allocation of CSI-RS according to the embodiment. Each encoded bit has a systematic bit (S) which indicates the data body before encoding, and a parity bit (P) which indicates redundant data added by encoding. In LTE, a signal after rate-matching is allocated in the allocation resource in accordance with the frequency-first rule from the beginning of the resource. In the allocation resource of one RB/Sub-frame, namely, allocation starting from the systematic bit is performed in sub-carriers from the top OFDM symbol in the frequency direction, and thereafter returned to the top sub-carrier of the next OFDM symbol, and allocation in the frequency direction is applied. This is repeated until the last symbol. In the transmission data, therefore, the systematic bit is allocated in the head side in the time axis in the allocation resource, and the parity bit is allocated in the rear side. Therefore, the last half symbol in the corresponding resource has a higher possibility that the parity bit is allocated.

In the embodiment, therefore, CSI-RS is allocated in an allocation rule which is opposite to the rule of allocation of encoded bits of the data part, as shown in FIG. 4. Namely, CSI-RS is sequentially allocated with starting from the end symbol in the time axis in the allocation resource, oppositely also in the frequency direction. At this time, as shown in a frame in which RB12 of Sub-frame #0 is enlarged in FIG. 3, RE (symbol sub-carrier) for transmitting CSI-RS is located in the end portion in the allocation resource of one RB/Sub-frame, and RE in a position corresponding to the parity bit in data for a user equipment is reallocated with CSI-RS. Therefore, puncture of the data part by CSI-RS can be prevented from affecting the systematic bit. As compared with the case where the systematic bit is reallocated with CSI-RS, therefore, a demodulation error in demodulation of the corresponding data can be caused to hardly occur. The CSI-RS allocation information instructing the allocation of the reference signal may be informed as notification information indicating control information of the whole cell, or may be informed as Radio resource control (RRC) information for individual user equipment.

In the embodiment, in the reception apparatus, by using the reference signal CSI-RS which is allocated in a symbol in a last half side in the time axis in a sub-frame of a specific resource that is previously informed by the CSI-RS allocation, the channel quality is measured, and reported to the transmission apparatus. In the transmission apparatus, the specific resource which is used in transmission of CSI-RS is previously informed to the reception apparatus, the reference signal CSI-RS is transmitted by using a symbol in a last half side in the time axis in a sub-frame of the corresponding resource, and a result of the measurement of the channel quality is received from the reception apparatus. By using the result of the measurement of the channel quality which is reported from the reception apparatus, the frequency scheduling and the adaptive MCS control are performed.

Here, the reference signal CSI-RS for LTE-A is allocated in the last half side of a specific RB/Sub-frame in the time direction, and CSI-RS is not located in the part of the systematic bit of data for a user equipment allocated from the beginning of the resource. Even in the case where an LTE user equipment is allocated to a resource of a RB/Sub-frame for transmitting CSI-RS and multiplexing is performed, therefore, the possibility that the systematic bit of the data for the LTE user equipment is punctured can be reduced. Therefore, the possibility that deterioration of the demodulation performance occurs in the LTE user equipment can be reduced. Because of this, the throughput can be prevented from being deteriorated.

(Modifications)

In the first embodiment described above, the operation of transmitting CSI-RS is performed by means of an arbitrary resource which is previously informed. Alternatively, an operation of transmitting CSI-RS in accordance with the allocation of the notification information may be performed. A specific example will be described as a modification. In LTE, in accordance with the method of using a physical resource, notification information can be classified into three kinds or MIB (Master Information Block), SIB (System Information Block) 1, and SIB 2 to SIB 11 (i.e., SIBs subsequent to SIB 2).

In more detail, MIB is transmitted by P-BCH (Physical Broadcast Channel) using a fixed sub-frame (for example, Sub-frame #0) and a fixed frequency resource. Moreover, SIB 1 is transmitted by a fixed sub-frame (for example, Sub-frame #5 every three frames). Furthermore, SIBs subsequent to SIB 2 are transmitted by one of transmittable sub-frames (SI-window) indicated in scheduling information contained in SIB 1. In the case of SIBs subsequent to SIB 2, a sub-frame in which SIB is transmitted is indicated in a downlink control channel (for example, PDCCH (Physical Dedicated Control Channel)) which is informed by the sub-frame. In a terminal, namely, it is not known which one of sub-frames is used for transmitting SIBs subsequent to SIB 2, until PDCCH is received by the sub-frame. PDCCH contains also information indicating which one of RBs is used for transmitting SIBs subsequent to SIB 2.

Here, the above-described notification information must be received by both an LTE user equipment and an LTE-A user equipment. When the notification information is transmitted by using RB in which CSI-RS is allocated, therefore, the systematic bit of the notification information is punctured, and the demodulation performance is deteriorated particularly in an LTE user equipment.

When an operation of transmitting CSI-RS is performed in accordance with the allocation of the notification information while considering this point, it is possible to prevent the error rate characteristic of notification information in an LTE user equipment from being deteriorated. More specifically, in a sub-frame in which MIB or SIB 1 is transmitted, CSI-RS is not transmitted, and, in a sub-frame in which SIBs subsequent to SIB 2 are transmitted, CSI-RS is allocated in specific RB in a similar manner as the first embodiment. By contrast, SIBs subsequent to SIB 2 are transmitted by using RB other than RB in which CSI-RS is allocated. In an LTE-A user equipment, a sub-frame in which MIB or SIB 1 is transmitted is already known. Therefore, an LTE-A user equipment may be configured so that CQI measurement is not performed in a sub-frame in which MIB or SIB 1 is transmitted. In a sub-frame in which MIB or SIB 1 that must be received by both an LTE user equipment and an LTE-A user equipment is transmitted, moreover, CSI-RS is not allocated, and notification information is not punctured. When the base station transmits notification information while encoding it with a sufficiently low encoding ratio, therefore, it is possible to prevent the error rate characteristic of notification information in a sub-frame in which notification information is transmitted, from being deteriorated.

By contrast, SIBs subsequent to SIB 2 are transmitted by using RB other than RB in which CSI-RS is allocated. In an LTE-A user equipment, a sub-frame in which SIBs subsequent to SIB 2 are transmitted is not known. In the embodiment, however, an LTE-A user equipment can perform usual CQI measurement irrespective of whether it is a sub-frame in which SIBs subsequent to SIB 2 are transmitted or not. In an LTE-A user equipment, therefore, it is not necessary to determine whether, after PDCCH is received, CQI measurement is to be performed or not, and hence simplification of a user equipment process and reduction of delay can be realized. Moreover, SIBs subsequent to SIB 2 are transmitted by RB in which only the reference signal RS for LTE that is used in both an LTE user equipment and an LTE-A user equipment is allocated. Also in an LTE user equipment, therefore, it is possible to surely receive notification information.

In this case, in an LTE-A user equipment, a sub-frame is already known in which notification information (notification information SIB+ for an LTE-A user equipment) that must be received by only an LTE-A user equipment in contrast to the above-described notification information that must be received by both an LTE user equipment and an LTE-A user equipment is transmitted. In an LTE-A user equipment, also CSI-RS allocation is already known. In the case where notification information SIB+ for an LTE-A user equipment is transmitted, therefore, it is not required to impose limitation on a sub-frame (or RB) in which only the reference signal RS for LTE is allocated, and a sub-frame (or RB) in which SIB+ is transmitted.

In the modification, the example in which SIBs subsequent to SIB 2 are transmitted by using RB other than RB in which CSI-RS is allocated has been described. In the invention, however, SIBs subsequent to SIB 2 may be transmitted by a sub-frame other than that in which CSI-RS is allocated. Alternatively, based on SI-window informed by SIB 1, CSI-RS may be allocated in a sub-frame other than that in which SIBs subsequent to SIB 2 are transmitted.

Not only in MIB and SIB 1 to SIB 11, but also in, for example, a sub-frame (MBSFN sub-frame) in which data of MBSFN (MBMS Single Frequency Network) are transmitted, CSI-RS may not be allocated. Namely, CSI-RS may be allocated in a sub-frame other than an MBSFN sub-frame.

Second Embodiment

In a second embodiment, in the case where CSI-RS is allocated in a resource of a specific RB/Sub-frame, transmission is performed while CSI-RS is allocated by, in the last symbol in a sub-frame, using the frequency allocation of specific control information, specifically, the frequency allocation of Physical Control Format Indicator Channel (PCFICH). Here, only points which are different from the first embodiment will be described. The configurations of the reception apparatus and the transmission apparatus are identical with those of the first embodiment shown in FIGS. 1 and 2, and their description is omitted. In the second embodiment, the operations of the CSI-RS allocation setting section 237 and CSI-RS generator 238 in the transmission apparatus, and the contents of CSI-RS allocation information which is informed from the transmission apparatus to the reception apparatus are different.

Figure 5:
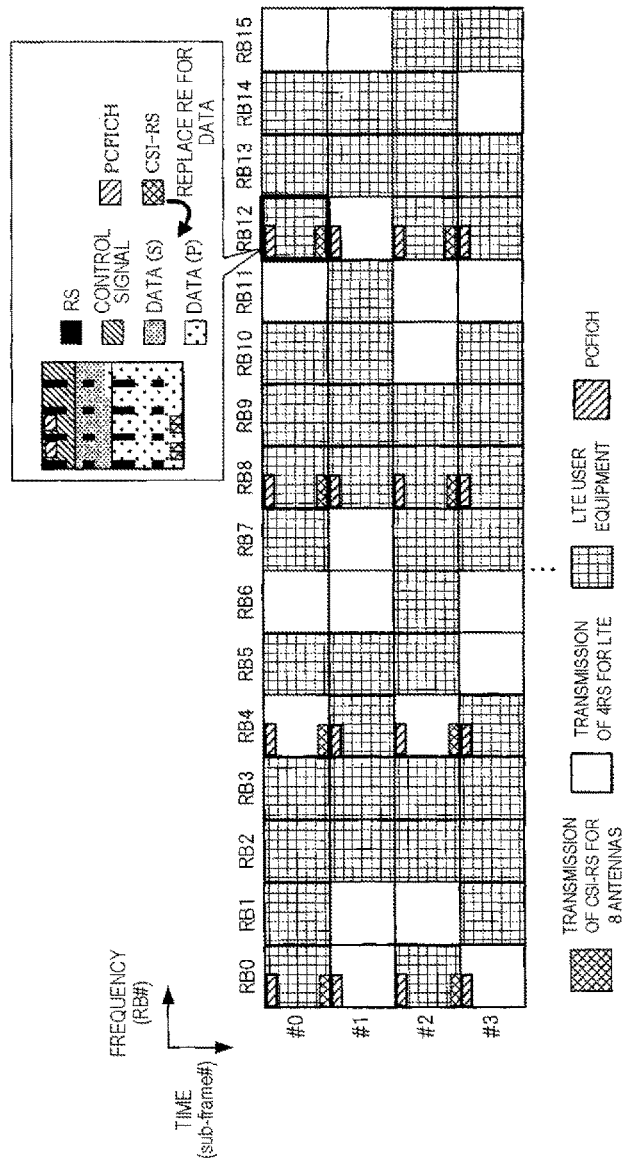
FIG. 5 is a diagram showing the CSI-RS transmission method in a second embodiment.

FIG. 5 is a diagram showing the CSI-RS transmission method in the second embodiment, and shows an allocation example of reference signals, control signals, data, and the like on resources. In the second embodiment, among specific RB/Sub-frames (RB0, RB4, RB8, RB12 in the illustrated example) for transmitting CSI-RS, the last OFDM symbol is used, and the reference signal CSI-RS is allocated and transmitted by RE (blocks indicated by net-like hatching in the figure) of a sub-carrier of the frequency corresponding to the PCFICH frequency resource (blocks indicated by oblique hatching in the figure) which is in the top OFDM symbol.

The CSI-RS allocation setting section 237 sets resources of reference signals so that CSI-RS is allocated in the frequency resource corresponding to the frequency allocation of PCFICH in the last OFDM symbol of a specific RB/Sub-frame as described above. In accordance with the above-described setting of CSI-RS allocation, the CSI-RS generator 238 generates CSI-RS, and allocates it in the corresponding resource. Based on the above-described setting of CSI-RS allocation, the scheduler 236 allocates user equipments including an LTE user equipment to resources including RB/Sub-frames for transmitting CSI-RS.

At this time, similarly with the first embodiment, CSI-RS is allocated in a symbol in a position where the possibility that a parity bit is allocated is high, and the data part of the parity bit part is punctured. Therefore, it is possible to prevent from affecting the systematic bit, and deterioration of the demodulation performance in an LTE user equipment can be avoided. In the embodiment, the frequency resource notification of PCFICH is diverted in allocation of CSI-RS, so that CSI-RS can be widely distributed in the system band.

(Modifications)

Figure 6:
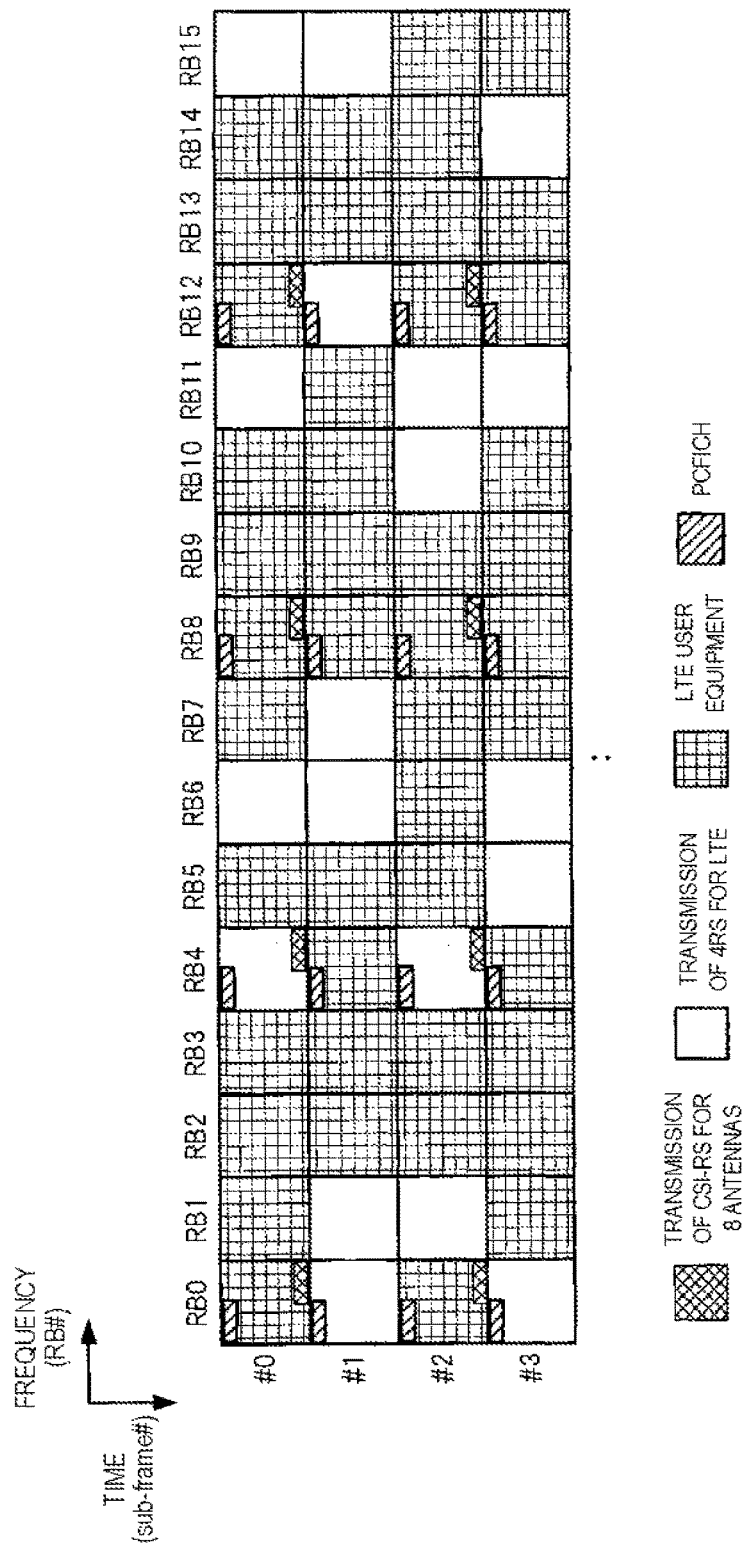
FIG. 6 is a diagram showing the CSI-RS transmission method in a first modification of the second embodiment.

Hereinafter, several modifications of the second embodiment will be described. FIG. 6 is a diagram showing the CSI-RS transmission method in a first modification of the second embodiment. In the first modification, the frequency allocation rule of PCFICH is applied in the opposite direction. In the last OFDM symbol of a specific RB/Sub-frame, namely, CSI-RS is allocated in the opposite direction with starting from the tail end sub-carrier to the frequency resource of PCFICH.

Figure 7:
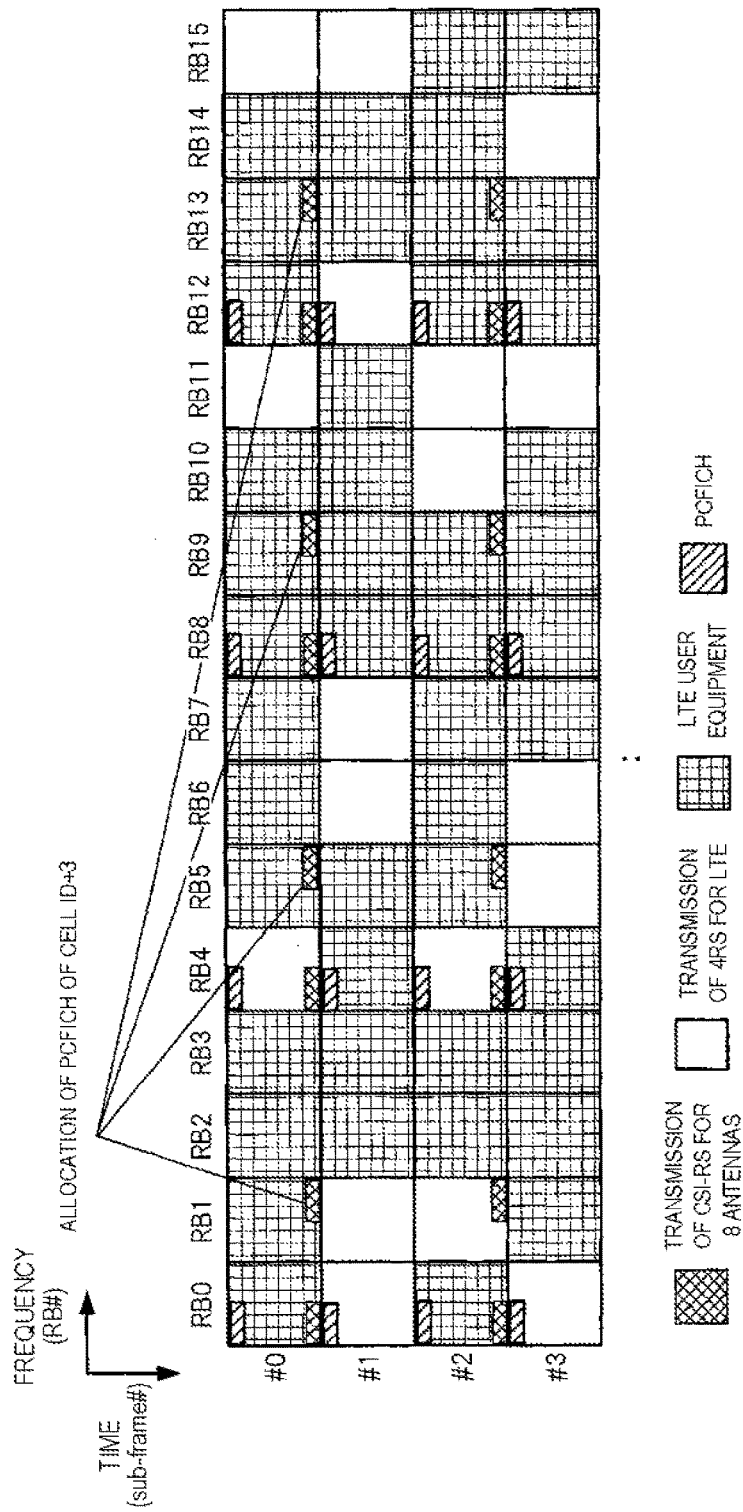
FIG. 7 is a diagram showing the CSI-RS transmission method in a second modification of the second embodiment.

FIG. 7 is a diagram showing the CSI-RS transmission method in a second modification of the second embodiment. In the second modification, the configuration where the frequency resource of PCFICH is defined in accordance with the cell ID of the cellular system is diverted, and the frequency allocation of PCFICH corresponding to cell ID+n is used together with allocation of CSI-RS in the second embodiment. FIG. 7 shows an example where CSI-RS is allocated in accordance with the frequency allocation of PCFICH corresponding to cell ID+3.

Figure 8:
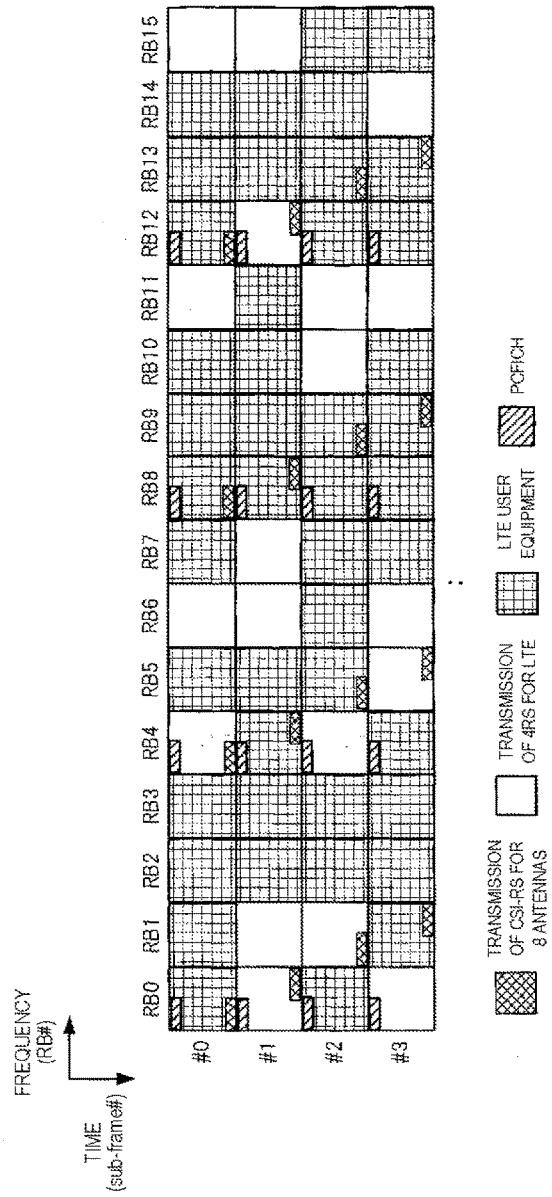
FIG. 8 is a diagram showing the CSI-RS transmission method in a third modification of the second embodiment.

FIG. 8 is a diagram showing the CSI-RS transmission method in a third modification of the second embodiment. In the third modification, the frequency allocation of CSI-RS is performed while being shifted in the frequency direction for each sub-frame in accordance with the frame number Sub-frame # in the time direction.

Here, attention may be focused on the viewpoint of the above-described notification information, and CSI-RS may be allocated in RBs which are shifted every sub-frame not containing a sub-frame in which notification information is transmitted. CSI-RS is not allocated in a sub-frame in which notification information is transmitted. According to the configuration, RBs in which CSI-RS is allocated are constant at a specific period irrespective of existence/non-existence of notification information. Therefore, LTE user equipments which are located in cells are requested only to measure CQI in a sub-frame in which notification information is transmitted, and a circuit which is necessary for CQI measurement in an LTE user equipment can be simplified. In the case where CSI-RS is allocated to different RBs among cells in order to avoid interference of RSs among cells, the relationship of RBs where CSI-RS is allocated (the RB allocation relationship for avoiding interference) is maintained among cells irrespective of existence/non-existence of notification information, and hence the effect of mitigating interference is not deteriorated.

Figure 9:
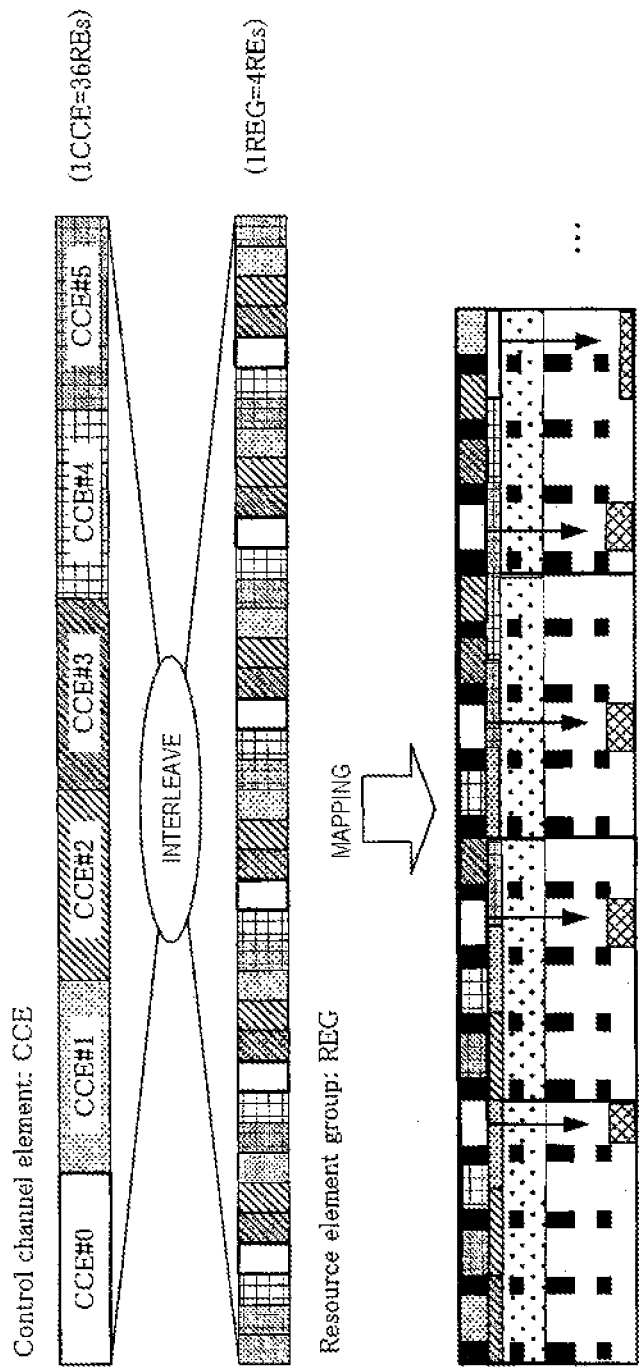
FIG. 9 is a diagram showing the CSI-RS transmission method in a fourth modification of the second embodiment.

FIG. 9 is a diagram showing the CSI-RS transmission method in a fourth modification of the second embodiment. Although the second embodiment is configured so as to use the frequency allocation of PCFICH, the embodiment may use the frequency allocation of CCE (Control channel element) which is used in a downlink control channel, as in the fourth modification. Specifically, the frequency resource corresponding to a CCE-ID which is previously informed is diverted as shown in FIG. 9.

CCEs are arranged in the ascending order of CCE-IDs, then interleaved in the unit of Resource element group (REG), and sequentially stored in a corresponding control signal region. A user equipment functioning as a reception apparatus can find the frequency allocation of corresponding CCE from CCE-IDs which are previously informed, and hence determines that corresponding frequency resources are storing locations of CSI-RS (regions indicated by net-like hatching in the figure) with starting from the last OFDM symbol in a sub-frame at the number same as the time axis symbols of the corresponding REG. Then, the operation of measuring the channel quality is performed by using CSI-RS which is allocated in the position. The CCE allocation may be sometimes changed in accordance with the width of the control signal region which is changeable in the unit of a sub-frame. A configuration where three symbols are used in storing CSI-RS may be fixedly set. Although CSI-RS is set time axis symbols of the same number as CCE, only the last symbol may be used, or the last two symbols may be always used.

Also in the modulations, similarly with the second embodiment, deterioration of the demodulation performance in an LTE user equipment can be avoided, and, since the resource notification of the frequency allocation of the control information is diverted, CSI-RS can be allocated in the system band in a widely distributed manner.

Third Embodiment

Figure 10:
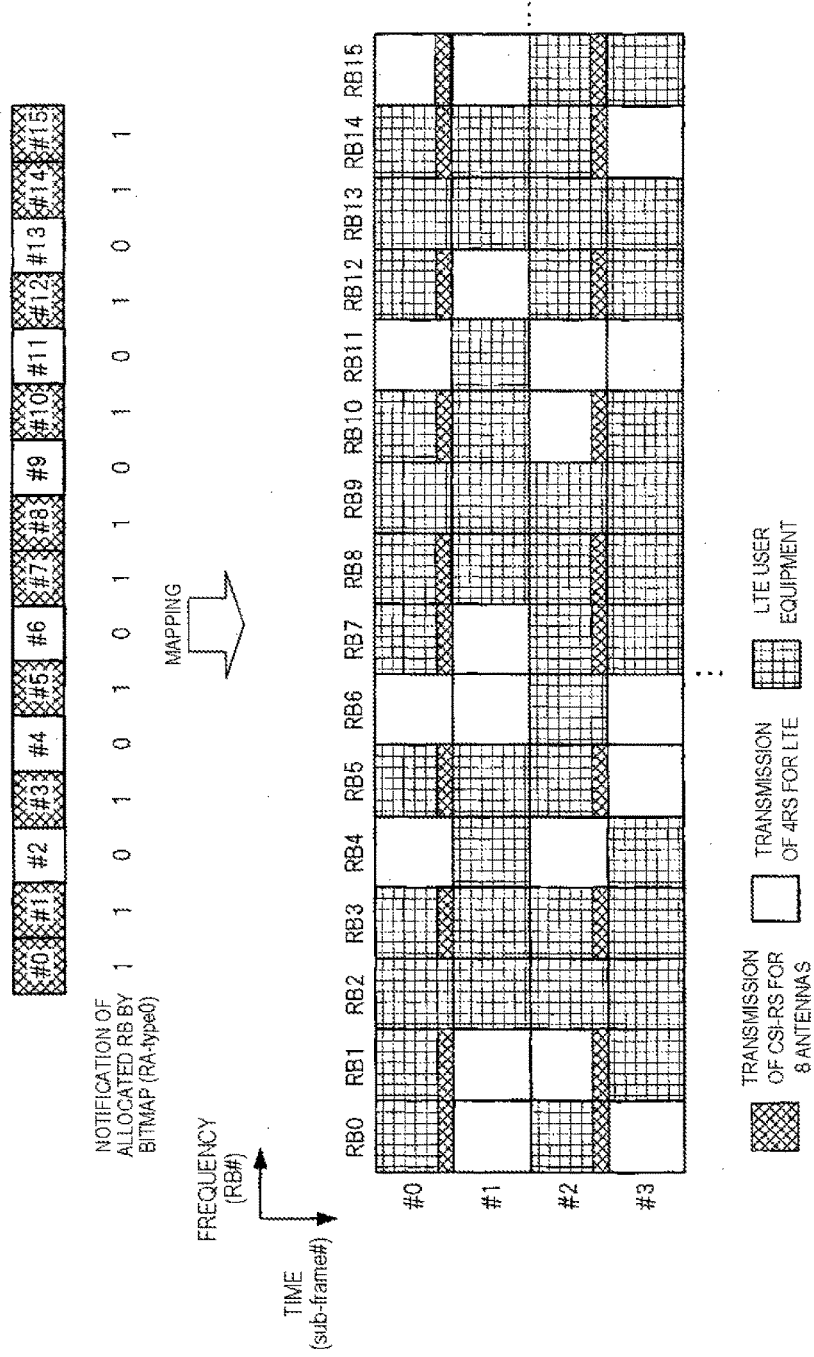
FIG. 10 is a diagram showing the CSI-RS transmission method in a third embodiment.

FIG. 10 is a diagram showing the CSI-RS transmission method in a third embodiment. The third embodiment is an example in which the first embodiment is partly modified. The first embodiment is configured so that CSI-RS is transmitted by a predetermined RB/Sub-frame. As in the third embodiment, when a resource in which CSI-RS is allocated is notified, the bitmap technique which is used in LVRB may be used.

In the third embodiment, as shown in FIG. 10, by the bitmap technique which is used in RA-type0 (Resource allocation-type0), RB/Sub-frames for CSI-RS transmission (RB0, RB1, RB3, RB5, RB7, RB8, RB10, RB12, RB14, RB15 in the illustrated example) are informed by using a bitmap of 1/0. Here, it is assumed that CSI-RS is allocated in several symbols from the end of the last half side of the corresponding RB/Sub-frame.

Figure 11:
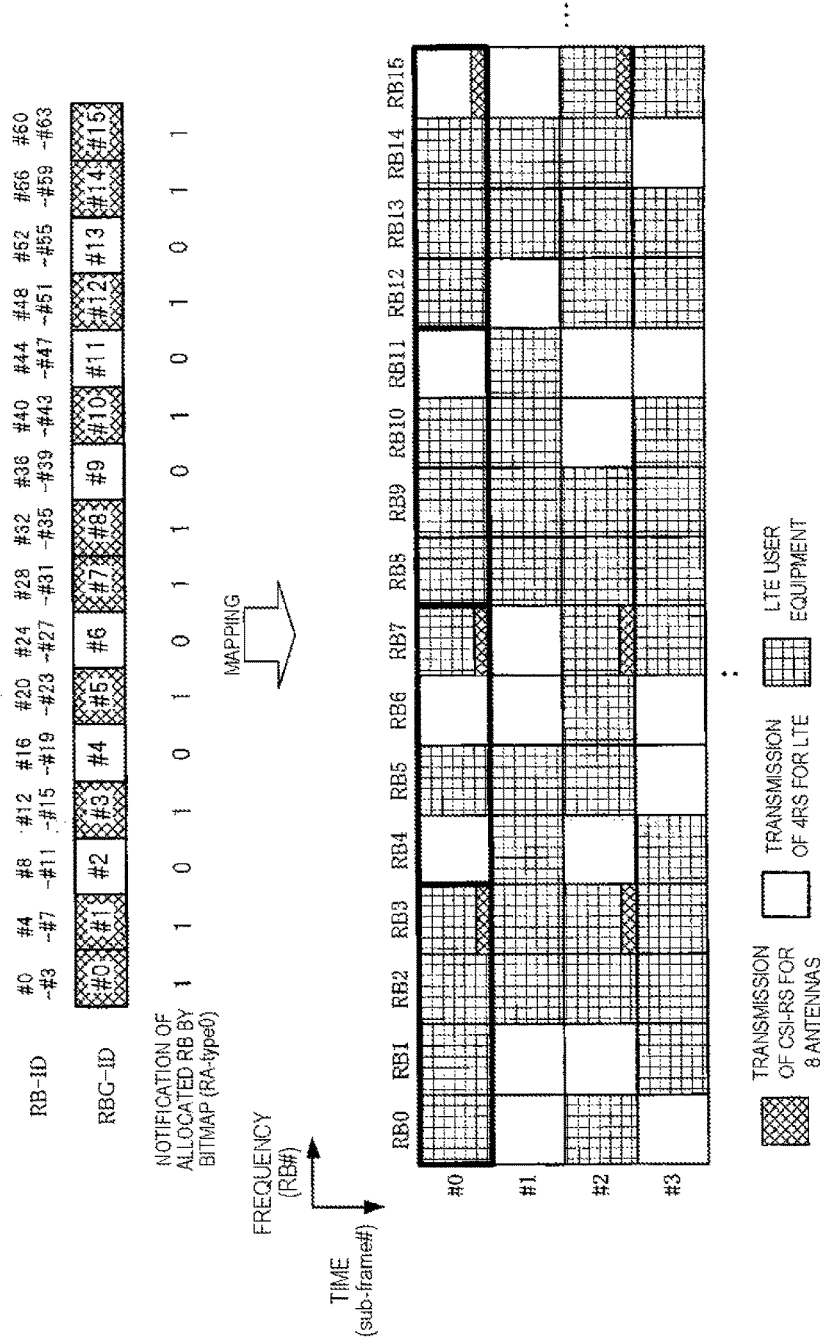
FIG. 11 is a diagram showing the CSI-RS transmission method in a modification of the third embodiment.
Figure 12:
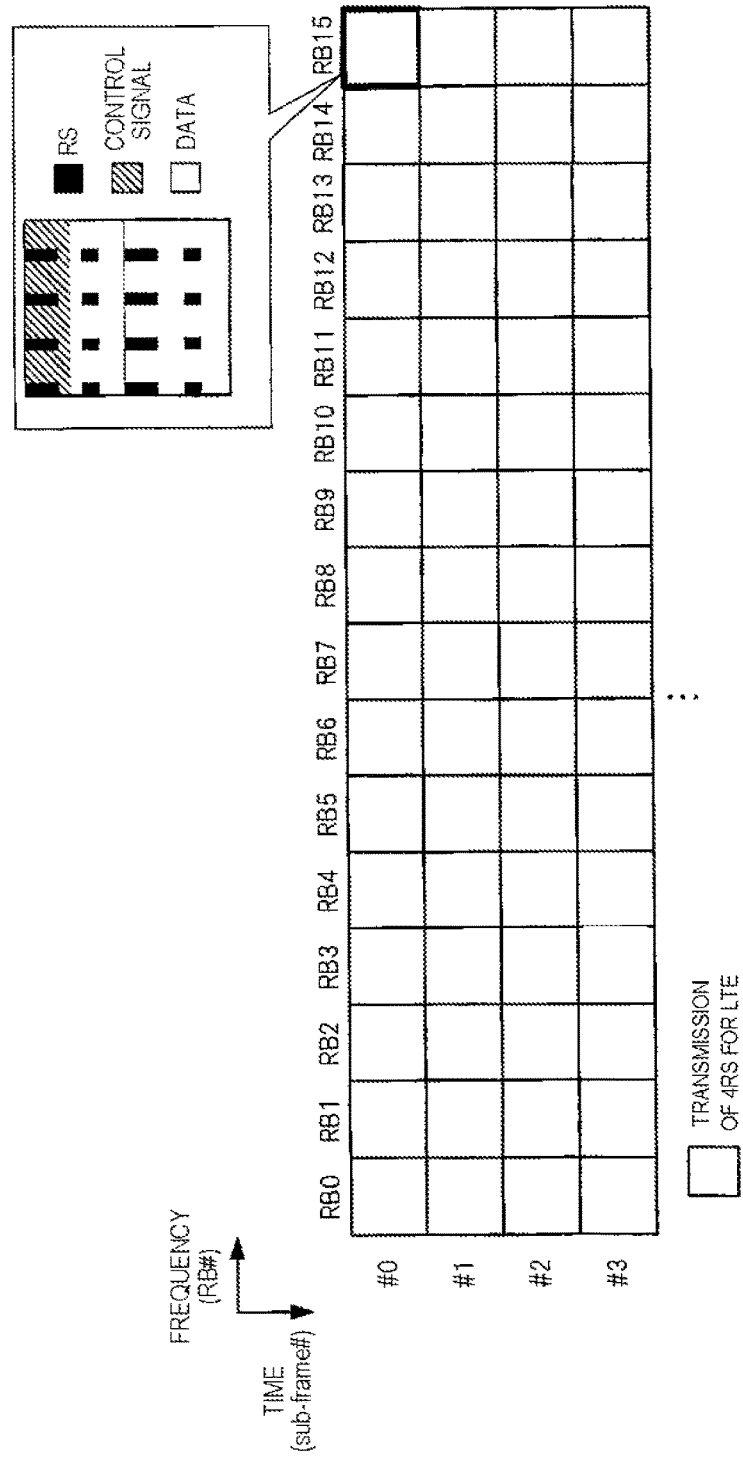
FIG. 12 is a diagram showing a configuration example of a frame of LTE.
Figure 13:
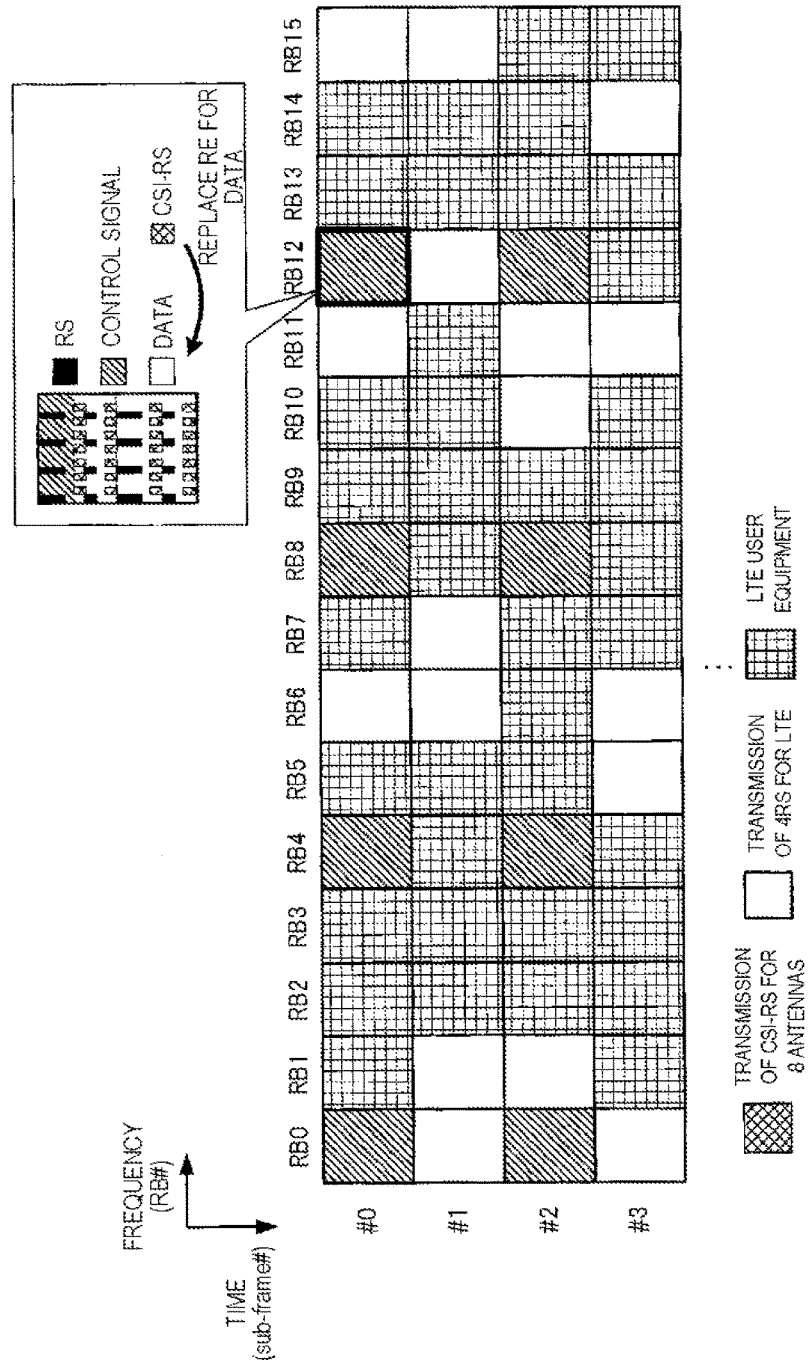
FIG. 13 is a diagram showing a conventional example of a CSI-RS transmission method corresponding to LTE-A.

FIG. 11 is a diagram showing the CSI-RS transmission method in a modification of the third embodiment. In the case where the system band width is broad, Resource block group (RBG) is defined in the bitmap technique of LVRB, and an operation of increasing the particle size of the frequency resource indicated by 1 bit of the bitmap is performed. In this case, a configuration where, as shown in FIG. 11, CSI-RS is allocated in the RB/Sub-frame of the largest number in RBG may be employed. In addition to this, the offset amount (0 to (RBG−1)) of the RB number is informed, thereby enabling the CSI-RS allocation to be set. FIG. 11 shows a configuration where, in the case of RBG=4, CSI-RS is allocated in RB (RB3 in RBG of RB1 to RB3) of the largest number. In this case, the offset amount corresponds to RBG−1=3.

Also in the third embodiment, similarly with the first embodiment, puncture of the data part by CSI-RS can be prevented from affecting the systematic bit, and deterioration of the demodulation performance in an LTE user equipment can be avoided. Furthermore, the resource allocation notification of LVRB is diverted, so that, similarly with the second embodiment, CSI-RS can be allocated in the system band in a widely distributed manner.

In the invention, it is expected that those skilled in the art will change or apply the matters based on the description in the description and the well-known technique without departing the spirit and scope of the invention, and such a change or application is included in the range to be protected. Furthermore, components of the embodiments may be arbitrarily combined with one another without departing the spirit of the invention.

In the description of the embodiments, antennas are adopted, but the embodiments can also be applied to an antenna port. The antenna port refers to a logical antenna configured by one or a plurality of physical antennas. That is, the antenna port does not necessarily refer to one physical antenna, and may refer to an array antenna configured by of a plurality of antennas, or the like. In LTE, for example, the number of physical antennas constituting an antenna port is not particularly defined, and is defined as the minimum unit in which a base station can transmit different Reference signals. The antenna port may be defined as the minimum unit for multiplying weighting of Precoding vector.

Although, in the embodiments, the case where the invention is configured by hardware has been exemplarily described, the invention can be realized by software.

Typically, the functional blocks which are used in the descriptions of the embodiments are realized in the form of an LSI which is an integrated circuit. They may be individually integrated in one chip, or part or all of them may be integrated in one chip. Although such an integrated circuit is referred to as an LSI, such an integrated circuit may be called an IC, a system LSI, a super LSI, or an ultra LSI depending on the degree of integration.

The method of realizing such an integrated circuit is not limited to an LSI, and the integrated circuit may be realized by a dedicated circuit or a general-purpose processor. Alternatively, it is also possible to use an FPGA (Field Programmable Gate Array) which can be programmed after the production of the LSI, or a reconfigurable processor in which the connections or settings of circuit cells in the LSI can be reconfigured.

Furthermore, with the advancement of semiconductor technologies or other technologies derived therefrom, when integrated circuit technologies which reallocate LSIs emerge, it is a matter of course that the functional blocks may be integrated using such technologies. The applications of biotechnologies, and the like are possible.

This application is based on Japanese Patent Application (No. 2009-063120) filed on Mar. 16, 2009, and its content is incorporated herein by reference.

INDUSTRIAL APPLICABILITY

The invention has an effect that, in the case where a second reference signal for a second communication system is transmitted in addition to a first reference signal for a first communication system, resources that affect a reception apparatus compatible only with the first communication system can be minimized, and the throughput can be prevented from being deteriorated, and is useful as a radio reception apparatus, a radio transmission apparatus, and a radio communication method which are applicable to a radio communication system such as a cellular system.

REFERENCE SIGNS LIST

111*a*, 111*b*: antenna
112*a*, 112*b*: reception RF section

113: channel estimator
114: CQI measuring section
115: MIMO demodulator
116: decoder
117: CRC checker
118: feedback information generator
119: encoder
120: multiplexer
121: transmission RF section
122: control signal demodulator
231$m$, 231$n$: user equipment signal processor
232: encoder/modulator
233: precoding processor
234$a$ to 234$d$, 234$e$ to 234$h$: transmission RF section
235$a$ to 235$d$, 235$e$ to 235$h$: antenna
236: scheduler
237: CSI-RS allocation setting section
238: CSI-RS generator
239: LTE 4RS generator
241: reception RF section
242: separator
243: demodulator/decoder
244: CRC checker

The invention claimed is:

1. A transmitting apparatus comprising:
circuitry, which, in operation:
  maps a first reference signal in symbols of both a former half and a latter half of a subframe according to a time direction;
  maps a second reference signal to only last two symbols in the latter half of the subframe; and
  maps data in a given symbol of the subframe in a frequency direction and then maps in a symbol, which is next to the given symbol in the time direction, of the subframe in the frequency direction, the data being comprised of systematic bits first followed by parity bits; and
a transmitter, which, in operation, transmits the mapped first reference signal, the mapped second reference signal and the mapped data,
wherein the first reference signal is a long-term evolution (LTE) reference signal in an LTE communication system, and the second reference signal is an LTE-Advanced reference signal in an LTE-Advanced communication system.

2. The transmitting apparatus according to claim 1, wherein the second reference signal is mapped in a given subframe of a plurality of subframes, and the first reference signal is mapped in all of the plurality of subframes.

3. The transmitting apparatus according to claim 1, wherein the second reference signal is not transmitted in a subframe where a transmission of the second reference signal collides with a transmission of PBCH or SIB1.

4. The transmitting apparatus according to claim 1, wherein the transmitter, in operation, transmits information related to a mapping of the second reference signal.

5. The transmitting apparatus according to claim 4, wherein the information indicates a subframe where the second reference signal is mapped.

6. The transmitting apparatus according to claim 1, wherein the second reference signal is cell-specific.

7. The transmitting apparatus according to claim 1, wherein the second reference signal is used for calculating at least one of CQI, PMI and RI.

8. The transmitting apparatus according to claim 1, wherein the second reference signal is a CSI-RS.

9. The transmitting apparatus according to claim 1, wherein a number of antenna ports in the LTE-Advanced communication system is greater than a number of antenna ports in the LTE communication system.

10. The transmitting apparatus according to claim 1, comprising a receiver, which, in operation, receives information on channel quality calculated using at least the second reference signal.

11. A transmitting method comprising:
mapping a first reference signal in symbols of both a former half and a latter half of a subframe according to a time direction;
mapping a second reference signal to only last two symbols in the latter half of the subframe;
mapping data in a given symbol of the subframe in a frequency direction and then mapping in a symbol, which is next to the given symbol in the time direction, of the subframe in the frequency direction, the data being comprised of systematic bits first followed by parity bits; and
transmitting the mapped first reference signal, the mapped second reference signal and the mapped data,
wherein the first reference signal is a long-term evolution (LTE) reference signal in an LTE communication system, and the second reference signal is an LTE-Advanced reference signal in an LTE-Advanced communication system.

* * * * *